(12) United States Patent
Abels et al.

(10) Patent No.: US 7,070,355 B2
(45) Date of Patent: Jul. 4, 2006

(54) BALL- AND -SOCKET JOINT

(75) Inventors: Olaf Abels, Belm (DE); Dieter Gröger, Damme (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 231 days.

(21) Appl. No.: 10/258,953

(22) PCT Filed: Mar. 21, 2002

(86) PCT No.: PCT/DE02/01027

§ 371 (c)(1),
(2), (4) Date: Oct. 29, 2002

(87) PCT Pub. No.: WO02/077470

PCT Pub. Date: Oct. 3, 2002

(65) Prior Publication Data

US 2003/0118395 A1 Jun. 26, 2003

(30) Foreign Application Priority Data

Mar. 23, 2001 (DE) .......................... 101 14 693

(51) Int. Cl.
  F16J 15/52 (2006.01)
  F16J 3/04 (2006.01)
  F16C 11/06 (2006.01)

(52) U.S. Cl. .................. 403/50; 403/51; 403/134; 277/634; 277/637; 277/651

(58) Field of Classification Search ............... 403/50, 403/51, 122, 134, 135; 277/635, 637, 634, 277/636, 651; 464/173, 175

See application file for complete search history.

(56) References Cited

U.S. PATENT DOCUMENTS

| 3,208,290 A | * | 9/1965 | Mathues et al. ......... 403/134 X |
| 3,248,955 A | * | 5/1966 | Templeton ................ 403/50 |
| 3,279,833 A | * | 10/1966 | Ihnacik, Jr. .............. 403/51 |
| 3,279,834 A | * | 10/1966 | Budzynski ............... 403/51 |
| 3,381,987 A | * | 5/1968 | Husen ..................... 403/51 |
| 3,901,518 A | * | 8/1975 | Uchida .................... 277/635 |
| 4,121,844 A | * | 10/1978 | Nemoto et al. ........... 277/635 |
| 4,220,418 A | * | 9/1980 | Kondo et al. ............ 277/635 X |
| 4,322,175 A | * | 3/1982 | Szczesny ................ 403/134 |
| 5,312,200 A |   | 5/1994 | Buhl et al. |
| 5,649,779 A | * | 7/1997 | Martin et al. ............ 403/51 |
| 6,350,075 B1 | * | 2/2002 | Abels .................... 403/134 |
| 6,644,883 B1 | * | 11/2003 | Davis .................... 403/122 |

FOREIGN PATENT DOCUMENTS

| DE | 1 266 074 | 4/1968 |
| DE | 198 43 063 | 10/2000 |
| JP | 60172778 | 9/1985 |
| WO | WO 00/55514 | 9/2000 |

* cited by examiner

Primary Examiner—John R. Cottingham
Assistant Examiner—Ryan M. Flandro
(74) Attorney, Agent, or Firm—McGlew and Tuttle, P.C.

(57) ABSTRACT

A ball-and-socket joint has a housing, a ball pivot (3) mounted pivotably in the housing, and a sealing bellows (1), which is fastened to the housing and is mounted on the ball pivot (3) slidably via a sealing ring (4) provided with two legs (5, 6). A first leg (5) of the two legs (5, 6) is in contact with the ball pivot (3) under tension and the second leg (6) meshes with the wall of the sealing bellows (1). The second leg (6) is, furthermore, fastened in an anchoring ring (7) arranged at least partially in the wall of the sealing bellows (1).

26 Claims, 3 Drawing Sheets

BALL-AND-SOCKET JOINT

FIELD OF THE INVENTION

The present invention pertains to a ball-and-socket joint with a housing a ball pivot mounted pivotably in the housing, and a sealing bellows, which is fastened to the housing and is mounted on the ball pivot slidably via a sealing ring having two legs, wherein a first of the two legs is in contact with the ball pivot under tension or force and the second leg meshes with the wall of the sealing bellows.

BACKGROUND OF THE INVENTION

Such a ball-and-socket joint is disclosed in DE 198 43 063 C1, in which a circular groove, which is engaged by the second leg of the sealing ring, is provided on the inner side of the sealing bellows. Loosening of the seat of the sealing ring may develop in this ball-and-socket joint because of adhesion problems between the sealing ring and the sealing bellows, which may lead to leakage. The anchoring of the plastic material in the material of the bellows is also expensive. Furthermore, the creep of the plastic, which can be expected to occur, may lead to leakage due to pretension.

SUMMARY OF THE INVENTION

The object of the present invention is to improve the seat of the sealing ring in the sealing bellows.

According to the present invention a ball-and-socket joint is provided with a housing, a ball pivot mounted pivotably in the housing, and a sealing bellows. The sealing bellows is fastened to the housing and is mounted on the ball pivot slidably via a sealing ring having two legs. A first of the two legs is in contact with the ball pivot under pretension, or pre-force, and the second leg meshes with the wall of the sealing bellows. The second leg is fastened in an anchoring ring arranged at least partially in the wall of the sealing bellows.

In the ball-and-socket joint according to the present invention, the sealing ring is fastened in an anchoring ring, which is arranged at least partially in the wall of the sealing bellows and which forms a separate bracket for the sealing ring. As a result, the seat of the sealing ring is considerably improved. The anchoring ring is also used to stiffen the sealing bellows in the sealing area, which leads to a more uniform distribution of the tensions in the sealing ring, e.g., during twisting or rotation of the bellows.

With its first leg, the sealing ring can be sealingly in contact with the ball pivot based on its internal stress alone. However, the sealing bellows preferably has a pressing area that is in contact with the first leg and presses same against the ball pivot. As a result, a radial pretension that is independent from the internal stress of the sealing ring is applied to the first leg of the sealing ring, so that a possible creeping of the material of the sealing ring can be compensated and tightness can be improved.

The two legs of the sealing ring may form, e.g., an acute angle with one another. However, there is a risk in this case that the end of the second leg facing away from the first leg is lifted off from the ball pivot, as a result of which contamination can enter between the sealing ring and the ball pivot. The two legs therefore preferably form a right angle or an obtuse angle with one another.

The sealing ring may be bonded to the anchoring ring or be welded to same (e.g., by plastic welding). The sealing ring and the anchoring ring may also be connected to one another in a frictionally engaged manner. However, the second leg of the sealing ring is fastened in the anchoring ring in a positive-locking manner.

The positive-locking connection between the sealing ring and the anchoring ring can be established by projections, which mesh with the anchoring ring, being provided on the second leg. However, recesses, with which the anchoring ring meshes, are preferably provided in the second leg.

The sealing ring may be manufactured from any desired material that guarantees the sealing between the sealing ring and the ball pivot over a long time even under dynamic loads. The sealing ring is preferably made for this purpose from a plastic, especially a PTFE material mixed with carbon (carbon-filled "PTFE compound").

The anchoring ring may have, e.g., a rectangular cross-sectional shape. However, the anchoring ring preferably has a cross section that has an L shape in at least some areas, as a result of which the stiffening of the sealing bellows is additionally improved in the sealing area. The anchoring ring may be arranged in a recess provided in the sealing bellows. However, the sealing bellows is preferably made of an injection-moldable elastomer, especially rubber, and the elastomer material is injection-molded at least partially around the anchoring ring. As a result, the effort for mounting the sealing ring together with the anchoring ring on the sealing bellows is considerably reduced, because the sealing ring does not have to be inserted, e.g., manually into a groove of the sealing bellows any longer.

The elastomer can be injection-molded directly around the anchoring ring. However, the anchoring ring is preferably coated with an adhering additive, which forms a connection with the substance of the elastomer, as a result of which the connection between the anchoring ring and the sealing bellows is improved.

The anchoring ring may be made of any desired material that is suitable for improving the seat of the sealing ring in the sealing bellows. However, the anchoring ring is preferably made of a plastic, especially a glass fiber-reinforced polyamide material (e.g., "PA 6.6+GF").

The present invention will be described below on the basis of a preferred embodiment with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
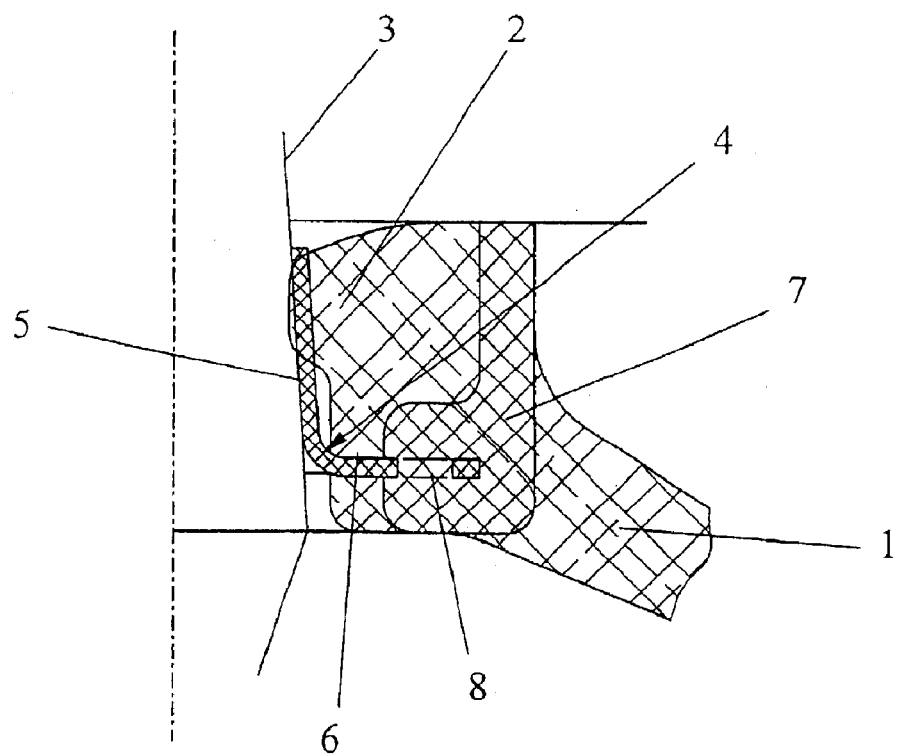
FIG. 1 is a partial sectional view of an embodiment of the ball-and-socket joint according to the present invention.

Referring to the drawings in particular, FIG. 1 shows a partial sectional view of an embodiment of the ball-and-socket joint according to the present invention, according to which a sealing bellows 1 is mounted with its upper end having a pressing area 2 on a ball pivot 3. The sealing bellows 1 is mounted slidably on the ball pivot 3 via a sealing ring 4 having two legs, wherein a first of the two legs 5 is in contact with the ball pivot 3 under tension and the second leg 6 meshes with the wall of the sealing bellows 1. The tension with which the first leg 5 is in contact with the ball pivot is determined by the internal stress of the sealing ring 4, on the one hand, and by the pressing area 2, which presses the first leg 5 against the ball pivot 3 in addition to the internal stress.

An anchoring ring 7, around which the elastomer material of the sealing bellows 1 is partially molded, is fastened in the wall of the sealing bellows 1. The second leg 6 of the sealing ring 4 is fastened to the anchoring ring 7 in a positive-locking manner, and recesses provided in the second leg 6 of the sealing ring 4 in the form of holes 8 are traversed by the material of the anchoring ring 7.

Figure 2:
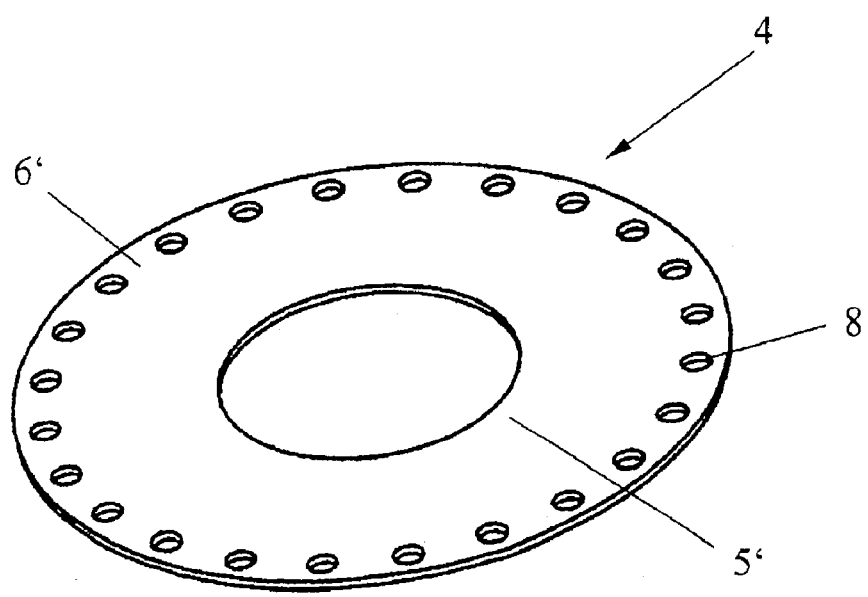
FIG. 2 is a perspective view showing a sealing ring according to the embodiment according to FIG. 1 in the unassembled state.

FIG. 2 shows a perspective view of the sealing ring 4 according to FIG. 1 in the unassembled state, wherein the (radially inner) area of the sealing ring 4 associated with the first leg 5 is designated by the reference number 5' and the (radially outer) area of the sealing ring 4 associated with the second leg 6 is designated with the reference number 6'. The two areas 5' and 6' are in one plane in the unassembled state of the sealing ring 4, the holes 8 in the radially outer area 6' being in the form of a circle of holes.

Figure 3:
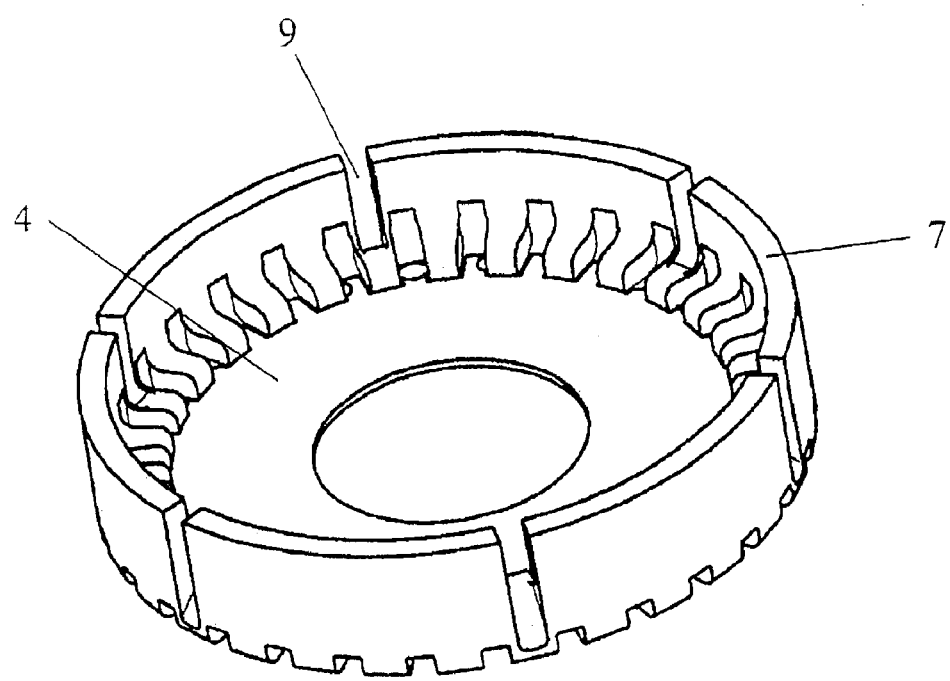
FIG. 3 is a perspective view showing an anchoring ring according to the embodiment according to FIG. 1, wherein the sealing ring according to FIG. 2 is already integrated within the anchoring ring.

FIG. 3 shows the anchoring ring 7, which is manufactured by partially injection-molding the material PA 6.6+GF or a plastic possessing comparable properties around the sealing ring 4. The material of the anchoring ring flows into the holes 8 of the sealing ring 4 during the injection-molding, so that a firm seat of the sealing ring 4, which is secured against rotation, is formed in the anchoring ring 7 after the curing or cooling of the material because of the positive-locking connection between the sealing ring 4 and the anchoring ring 7. The cross section of the anchoring ring 7 has an L shape in some areas and is provided with a plurality of slots 9 along its circumference.

Figure 4:
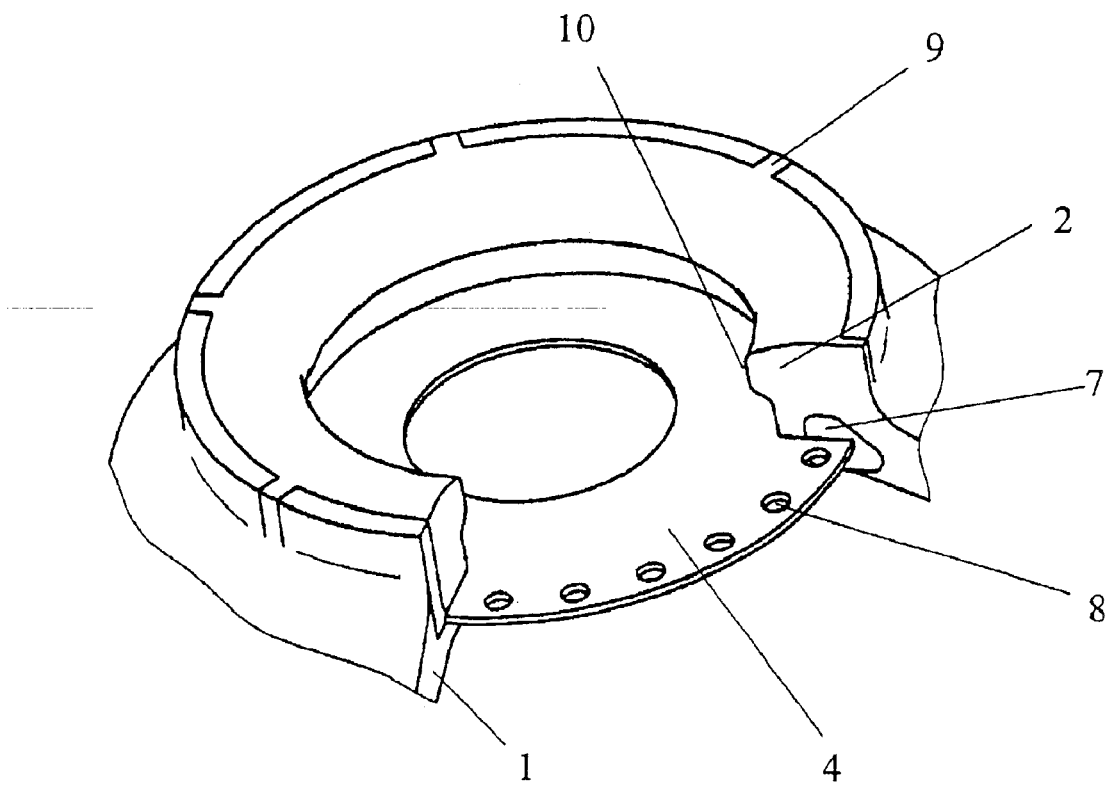
FIG. 4 is a partially cutaway view of the anchoring ring according to FIG. 3 arranged in the sealing bellows.
Figure 5:
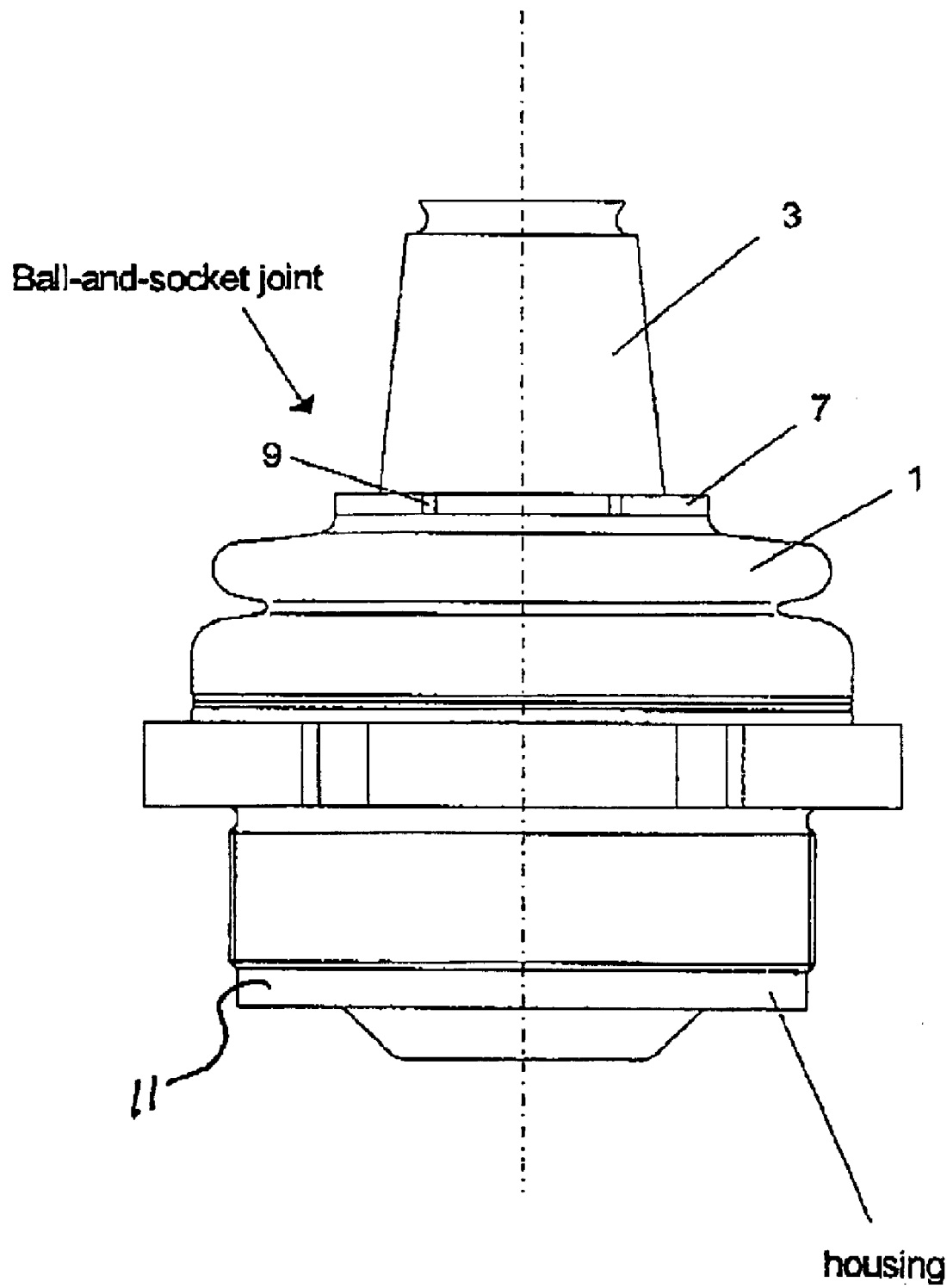
FIG. 5 is an external view of the ball pivot mounted in the housing, and the sealing bellows mounted in the housing.

As is apparent from FIG. 4, the anchoring ring 7 is arranged in the wall of the sealing bellows 1. The slots 9 are filled with elastomer material during the injection-molding of the elastomer around the anchoring ring 7, so that the anchoring ring 7 is seated secured against rotating in the wall of the sealing bellows 1 due to the positive-locking connection. Furthermore, the pressing area 2 has a projection 10, which is in contact with the first leg 5 in the assembled state.

During the assembly of the ball-and-socket joint, the sealing bellows 1 is pulled over the ball pivot 3. Since the internal diameter of the sealing ring 4 is smaller than the external diameter of the ball pivot 3 in the unassembled state, the area 5' of the sealing ring 4 is widened up during the pulling over and bent over relative to the area 6', so that after the assembly, the radially inner area 5' of the scaling 4 forms the first leg 5 that is in contact with the ball pivot 3 under pretension. The two legs 5 and 6 of the sealing ring 4, which are under internal stress, are thus formed from the two respective areas 5' and 6' due to the assembly, and the first leg 5 is, furthermore, pressed against the ball pivot by the projection 10 of the pressing area 2. The ball pivot 3 is placed in the housing 11 and the other end of the bellows 1 is connected to the housing 11.

While specific embodiments of the invention have been shown and described in detail to illustrate the application of the principles of the invention, it will be understood that the invention may be embodied otherwise without departing from such principles.

What is claimed is:

1. A ball-and-socket joint, comprising:
   a housing;
   a ball pivot mounted pivotably in the housing;
   a sealing bellows fastened to the housing;
   a sealing ring, said sealing bellows being mounted on said ball pivot slidably via said sealing ring, said sealing ring having two legs, a first of said two legs being in forced contact with said ball pivot and a second of said two legs meshing with a wall of said sealing bellows; and
   an anchoring ring arranged at least partially in a wall of said sealing bellows, said second leg being fastened in said anchoring ring.

2. A ball-and-socket joint in accordance with claim 1, wherein said sealing bellows has a area that is in contact with said first leg and presses said first leg against said ball pivot.

3. A ball-and-socket joint in accordance with claim 2, wherein:
   said pressing area has a projection in contact with said first leg.

4. A ball-and-socket joint in accordance with claim 1, wherein said two legs form a right angle or an obtuse angle with one another.

5. A ball-and-socket joint in accordance with claim 1, wherein said second leg is fastened in said anchoring ring in a positive-locking manner.

6. A ball-and-socket joint in accordance with claim 5, wherein said second leg has recesses, said anchoring ring having portions meshing in said recesses of said second leg.

7. A ball-and-socket joint in accordance with claim 6, wherein:
   said recesses are arranged in an outer radial area of said second leg and are arranged in a circular pattern.

8. A ball-and-socket joint in accordance with claim 7, wherein:
   a material of said anchoring ring traverses said holes.

9. A ball-and-socket joint in accordance with claim 6, wherein:
   a material of said anchoring ring traverses said holes.

10. A ball-and-socket joint in accordance with claim 1, wherein said sealing ring is made of a plastic.

11. A ball-and-socket joint in accordance with claim 10, wherein:
    said plastic is a PTFE material mixed with carbon.

12. A ball-and-socket joint in accordance with claim 1, wherein said anchoring ring has a cross section with an L shape.

13. A ball-and-socket joint in accordance with claim 12, wherein:
    said anchoring ring has a circumference defining slots extending in said cross section.

14. A ball-and-socket joint in accordance with claim 13, wherein:
    said sealing bellows is formed with an elastomer material, said elastomer material filling said slots to positively lock said anchoring ring to said sealing bellows against relative rotation with each other.

15. A ball-and-socket joint in accordance with claim 1, wherein said sealing bellows is made of an injection-moldable elastomer, and elastomer material is injection-molded at least partially around said anchoring ring.

16. A ball-and-socket joint in accordance with claim 15, wherein:
said injection-moldable elastomer is rubber.

17. A ball-and-socket joint in accordance with claim 1, wherein a surface of said anchoring ring is coated with an additive adhering to said sealing bellows.

18. A ball-and-socket joint in accordance with claim 1, wherein said anchoring ring is made of a plastic.

19. A ball-and-socket joint in accordance with claim 18, wherein:
said plastic is a glass fiber-reinforced polyamide material.

20. A ball-and-socket joint in accordance with claim 1, wherein:
said anchoring ring and said sealing ring are formed as separate structures.

21. A ball-and-socket joint in accordance with claim 20, wherein:
said anchoring ring is formed of a glass fiber-reinforced polyamide material;
said seal ring is formed of a PTFE material mixed with carbon.

22. A ball-and-socket joint in accordance with claim 20, wherein:
said first leg has a radially inner periphery forming a continuously circular edge.

23. A connection in accordance with claim 20, wherein:
said sealing bellows includes a pressing area;
said first leg is movable from a first position spaced from said pressing area to a second position in contact with said pressing area, said pressing area biasing said first leg against said ball pivot when said first leg is in said second position.

24. A connection in accordance with claim 23, wherein:
an anchoring ring is arranged in said end of said sealing bellows, said second leg being fixed to said anchoring ring, said anchoring ring being formed of a glass fiber-reinforced polyamide material and having a cross section with an L shape;
said sealing ring is formed of a PTFE material mixed with carbon;
said sealing bellows is made of an injection-moldable elastomer which is injection-molded onto said anchoring ring.

25. A ball-and-socket joint in accordance with claim 1, wherein:
said first leg has a radially inner periphery forming a continuously circular edge.

26. A connection comprising:
a ball pivot;
a sealing bellows arranged around the ball pivot;
a sealing ring slidably connecting said sealing bellows to said ball pivot, said sealing ring having a first leg formed of a material to bias said first leg into direct and sealing contact with said ball pivot, said sealing ring having a second leg fixed to an end of said sealing bellows;
wherein, said sealing bellows includes a pressing area;
said first leg is movable from a first position spaced from said pressing area to a second position in contact with said pressing area, said pressing area biasing said first leg against said ball pivot when said first leg is in said second position;
wherein, an anchoring ring is arranged in said end of said sealing bellows, said second leg being fixed to said anchoring ring, said anchoring ring being formed of a glass fiber-reinforced polyamide material having a cross section with an L shape;
said sealing ring is formed of a PTFE material mixed with carbon; and
said sealing bellows is made of an injection-moldable elastomer which is injection-molded onto said anchoring ring.

* * * * *